United States Patent
Ito et al.

(10) Patent No.: US 8,316,640 B2
(45) Date of Patent: Nov. 27, 2012

(54) DRAIN STRUCTURE OF TORQUE CONVERTER

(75) Inventors: Naoki Ito, Braunschweig (DE); Takeshi Torii, Anjo (JP); Yasunari Muranaka, Okazaki (JP); Nobukazu Ike, Kariya (JP); Shingo Uozumi, Nishio (JP); Tomohiro Umemura, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 923 days.

(21) Appl. No.: 12/382,607

(22) Filed: Mar. 19, 2009

(65) Prior Publication Data

US 2009/0241532 A1 Oct. 1, 2009

(30) Foreign Application Priority Data

Mar. 31, 2008 (JP) ................. 2008-093353

(51) Int. Cl.
*F16H 41/30* (2006.01)
*F16H 57/04* (2010.01)
(52) U.S. Cl. .......................... 60/357; 60/358
(58) Field of Classification Search .............. 60/357, 60/358
See application file for complete search history.

(56) References Cited

U.S. PATENT DOCUMENTS

2008/0138220 A1 * 6/2008 Kang ............................ 417/437

FOREIGN PATENT DOCUMENTS

| JP | 52-129875 | | 10/1977 |
| JP | 08121567 A | * | 5/1996 |
| JP | A-8-121567 | | 5/1996 |
| JP | 2006038065 A | * | 2/2006 |
| JP | A-2006-38065 | | 2/2006 |
| JP | A-2007-113739 | | 5/2007 |
| JP | A-2008-144956 | | 6/2008 |

OTHER PUBLICATIONS

Translation of Jun. 20, 2012 Office Action issued in Chinese Patent Application No. 200980101034.7.

* cited by examiner

*Primary Examiner* — Thomas E Lazo
(74) *Attorney, Agent, or Firm* — Oliff & Berridge, PLC

(57) ABSTRACT

A drain structure where oil sucked from the oil pan by the oil pump is supplied to the torque converter and circulates therein, and the oil is drained into the transmission case through a drain oil passage; and the drain oil passage passes through a gap between the torque converter and the oil pump, is guided to an upper part facing a fitting surface between the oil pump and the transmission case, and is further guided from the upper part to a part under the oil pump and opens above an oil level in the transmission case, and drain oil from the drain oil passage is discharged toward the oil pan.

5 Claims, 5 Drawing Sheets

I-I

F I G . 5A
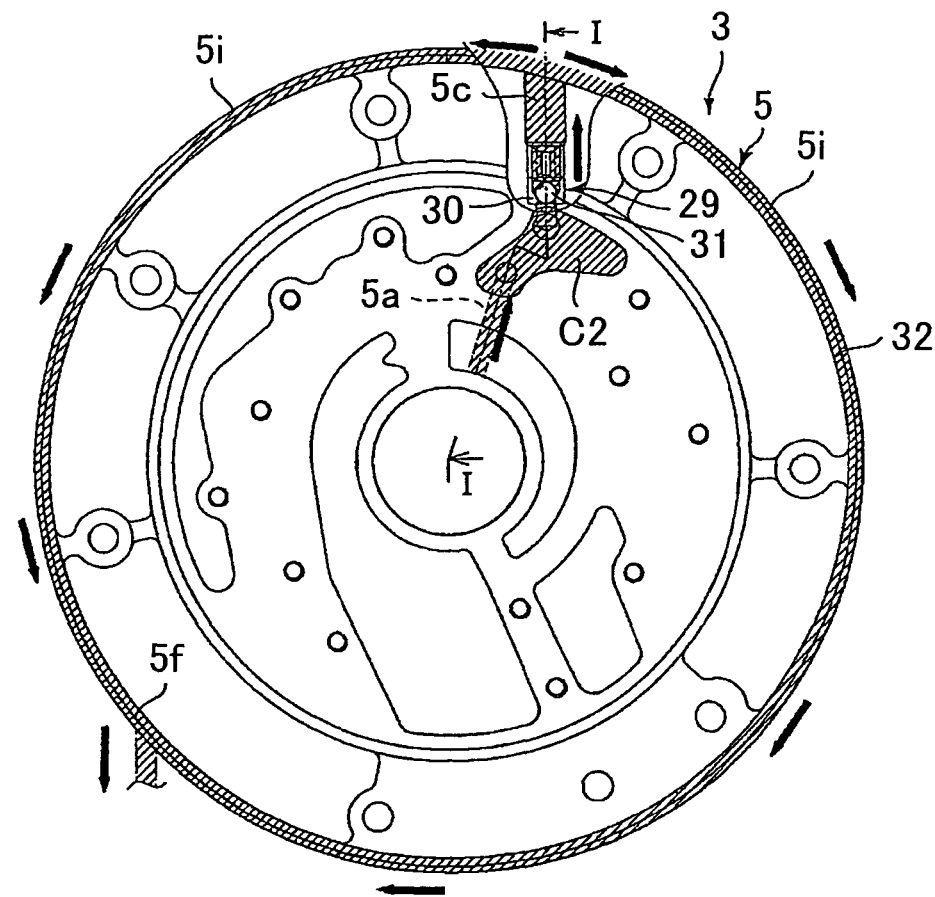
F I G . 5B
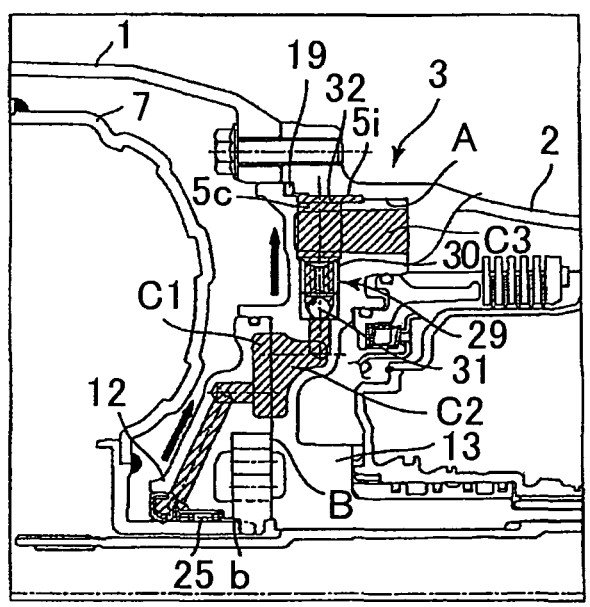
I-I

DRAIN STRUCTURE OF TORQUE CONVERTER

CROSS-REFERENCE TO RELATED APPLICATION

The disclosure of Japanese Patent Application No. 2008-093353 filed on Mar. 31, 2008 including the specification, drawings and abstract is incorporated herein by reference in its entirety.

BACKGROUND

The present invention relates to a drain structure of a torque converter.

An automatic transmission having a drain oil passage for draining oil of a torque converter to a transmission case through an oil pump body has been proposed by the applicant of the present invention (see Japanese Patent Application Publication JP-A-2006-38065). The drain oil passage has an oil passage formed in the oil pump body so as to extend radially upward from a gap between an impeller hub of the torque converter and a boss portion of the oil pump body, and an oil passage formed on a fitting surface between the oil pump body and the transmission case. An intake preventing device for holding drain oil is provided on the side adjacent to an outlet port in the drain oil passage.

The intake preventing device prevents an intake of air from a discharge opening of the drain oil passage even when a small amount of oil leakage occurs from another oil passage that communicates with the torque converter. Thus, oil reduction of the torque converter is prevented in a state where oil supply is prevented. As a result, the occurrence of a phenomenon (lost drive) that causes the driver to feel uncomfortable due to a decrease in transmitted torque is prevented during a starting operation right after the engine is started after a vehicle has not been used for a long time.

The above intake preventing device is formed by an annular oil passage extending substantially entirely around the fitting surface between the oil pump body and the transmission case, a check valve, a fine mesh net, a trap oil reservoir, or the like. However, each of these elements discharges drain oil from an upper part of the oil pump body toward the inside of the transmission case. The drain oil is therefore directly scattered onto an upper part of an automatic speed change mechanism in the transmission case. Especially in the case where the impeller hub is supported by the boss portion of the oil pump body through a rolling bearing, a large amount of drain oil flows from the torque converter (e.g., 2 to 3 l/min). If the drain oil is scattered on a rapidly rotating drum or the like, the oil is stirred and bubbles are generated, thereby causing oil to blow from a breather hole. Moreover, in a disengaged state, the drain oil is scattered on a clutch or a brake disc and discs having differential rotation between separators, and a dragging torque is generated, thereby causing power loss.

On the other hand, the above Japanese Patent Application Publication JP-A-2006-38065 also discloses an embodiment in which the drain oil passage extends half around an oil passage formed on the fitting surface so as to reach the lowermost part of the oil pump body, and a pipe is connected thereto to drain the drain oil under the oil level in the oil pan (See FIGS. 3 and 4 and the second embodiment of Japanese Patent Application Publication JP-A-2006-38065).

SUMMARY

This structure does not cause stirring of the ATF and the dragging torque described above, but has the following problems. The drain oil passage extends through an upper part of the valve body. However, the oil in the torque converter directly communicates with the oil in the transmission case (oil pan). Therefore, when an oil supply to the torque converter is discontinued upon stopping an operation of a vehicle, the oil of the torque converter is sucked out due to the difference in oil level between the torque converter and the transmission case according to the siphon principle. The oil level in the torque converter may therefore be lowered abruptly.

The drain oil passage has the annular oil passage extending substantially entirely (or half) around the fitting surface (spigot portion) between the oil pump body and the transmission case, and the oil pump body (and the oil pump cover) is formed by aluminum die casting. If a larger cutting margin for forming the annular oil passage in a scooped shape is provided in the outer peripheral surface of the pump body, pressure leakage may occur in the oil passage in the oil pump body due to blow holes. Moreover, in the case where the annular oil passage is formed around the fitting surface of the transmission case, an oil passage having a relatively large cross section is required to drain a relatively large amount of drain oil described above. However, increasing the oil passage size in a radial direction (height direction) increases the diameter of the transmission case accordingly. Increasing the oil passage size in an axial direction (width direction) reduces the length of the fitting surface (spigot portion) of the transmission case for fitting the oil pump body. This may make an accurate attachment of the oil pump difficult.

Therefore, it is an object of the present invention to solve the above problems by directly discharging drain oil from a torque converter toward an oil pan provided under a transmission case. The present invention can also achieve various other advantages.

An exemplary aspect of the invention includes a drain structure of a torque converter in an automatic transmission, the automatic transmission including the torque converter, an oil pump formed by an oil pump body and an oil pump cover, a transmission case accommodating the oil pump and an automatic speed change mechanism, and an oil pan provided under the transmission case. Oil sucked from the oil pan by the oil pump is supplied to the torque converter and circulates therein, and the oil is drained into the transmission case through a drain oil passage. The drain oil passage passes through a gap between the torque converter and the oil pump, is guided to an upper part facing a fitting surface between the oil pump and the transmission case, and is further guided from the upper part to a part under the oil pump and opens above an oil level in the transmission case, and drain oil from the drain oil passage is discharged toward the oil pan.

BRIEF DESCRIPTION OF THE DRAWINGS

Various exemplary aspects of the invention will be described with reference to the drawings, wherein:

FIG. 5A and FIG. 5B show diagrams of a fourth embodiment of the present invention, FIG. 5A being a front view of an oil pump cover and FIG. 5B being a cross-sectional view taken along line I-I in FIG. 5A.

DETAILED DESCRIPTION OF EMBODIMENTS

Figure 1:
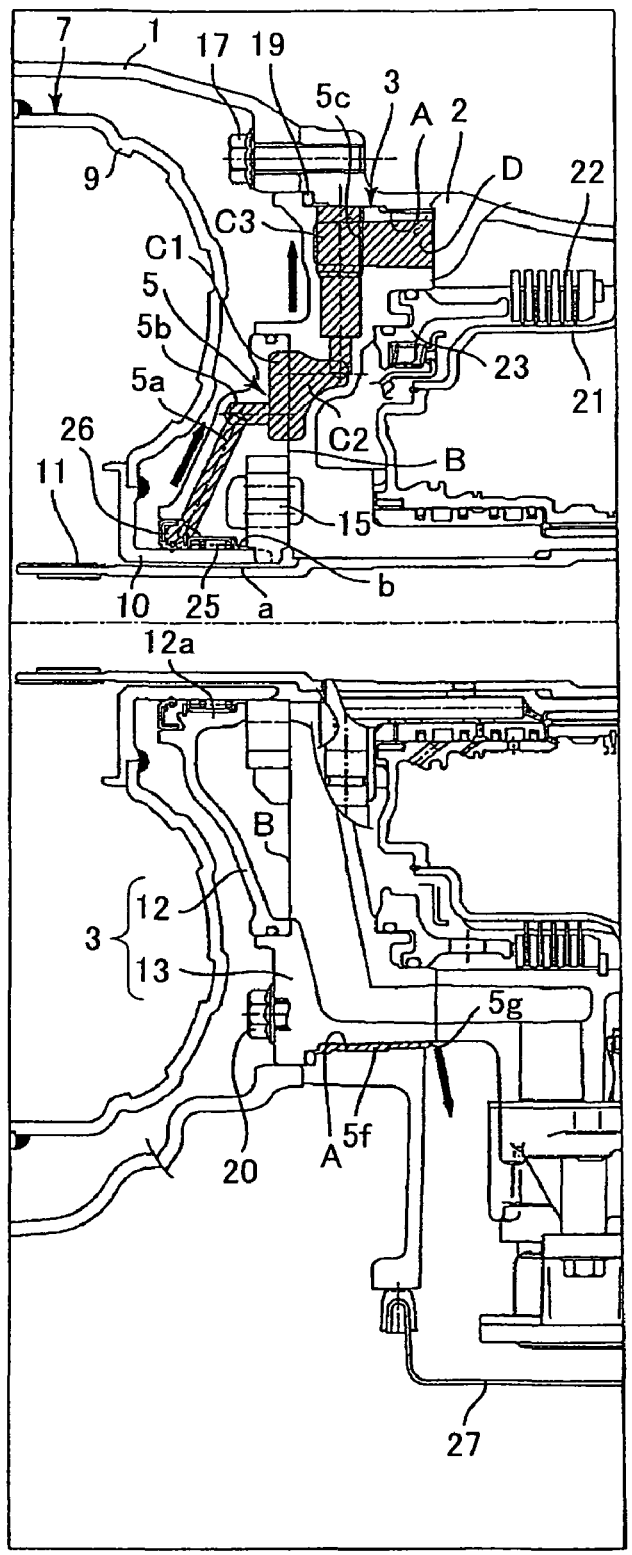
FIG. 1 is a longitudinal sectional view showing a first embodiment of a drain oil passage structure according to the present invention.

Hereinafter, embodiments of the present invention will be described with reference to the accompanying drawings. FIG. 1 is a longitudinal sectional view showing a portion of an oil pump 3 provided in a joint portion between a converter housing 1 and a transmission case 2. A drain oil passage 5 of a torque converter according to the present invention is provided in the portion of the oil pump 3.

Regarding a torque converter 7, only an impeller case 9 and an impeller hub 10 integral with the impeller case 9 are shown in the figure. Although not shown in the figure, the impeller case and a front cover integral with the impeller case form a converter case, and the converter case is filled with oil (automatic transmission fluid (ATF)). A pump impeller integral with the converter case, a turbine runner and a stator that are connected to an input shaft, and a lock-up clutch are accommodated in the converter case. Rotation of the converter case is transmitted to the not-shown input shaft through the oil that circulates between the pump impeller and the turbine runner via the stator fixed to a stator shaft 11, or is directly transmitted to the not-shown input shaft through the lock-up clutch. The oil is supplied and discharged to and from the converter case by switching the flow direction by a lock-up switch valve provided within a valve body. Engagement/disengagement operation of the lock-up clutch (including slip-control) is thus performed. The drain oil passage 5 is provided in order to discharge an excessive amount of oil supplied into the converter case.

The oil pump 3 is structured by integrally fixing an oil pump body 12 and an oil pump cover 13 together. A pump 15 is driven by rotation from the impeller hub 10 and generates an oil pressure required by the automatic transmission as a whole including the oil of the torque converter 7. In the present embodiment, the pump body 12 has a smaller diameter, the pump cover 13 has a larger diameter, and the pump cover 13 fits on a fitting surface (spigot portion) A of the transmission case 2. However, the pump body 12 may have a larger diameter and the pump body may fit in the transmission case 2. The drain structure of the present invention is applicable to both structures.

The oil pump 3 structured by joining the pump body 12 and the pump cover 13 forms a front wall portion of the transmission case 2. The oil pump 3 supports the converter case and support portions of the input shaft and the like. A number of oil passages are formed in the oil pump 3, such as a suction oil passage and a discharge oil passage of the pump 15, an input oil passage and an output oil passage for supplying and discharging an on/off pressure of the lock-up clutch, a lubrication pressure supply passage for lubricating each portion of a speed change mechanism, and a supply oil passage for supplying a servo pressure of a clutch or a brake of the speed change mechanism. In addition, the drain oil passage 5 of the torque converter according to the present invention is formed in the oil pump 3.

The oil pump 3 is structured by fitting the smaller-diameter oil pump body 12 on a front surface of the larger-diameter oil pump cover 13 and integrally fixing the oil pump body 12 and the oil pump cover 13 by a bolt. The gear pump 15 is held on a mating surface B therebetween. The pump cover and the pump body are produced by aluminum die casting, and a plurality of cast holes C1, C2, C3, C4, . . . are formed in the mating surface B and the like.

In the joint portion between the converter housing 1 and the transmission case 2, the larger-diameter oil pump cover 13 fits in an oil-tight manner on the fitting surface (spigot portion) A of the transmission case 2 and is integrally fixed. Note that, in the figure, reference numeral 17 denotes a bolt for fixing the converter housing 1 to the transmission case 2, reference numeral 19 denotes an O-ring for fitting the oil pump cover 13 to the case fitting surface A in an oil-tight manner, and reference numeral 20 denotes a bolt for fixing the oil pump cover 13 integral with the oil pump body 12 to the transmission case 2. An automatic speed change mechanism formed by a number of gears, clutch brakes, and the like is accommodated in the transmission case 2. A drum 21, a brake 22, and a hydraulic servo 23 are shown in the figure as a part of the automatic speed change mechanism.

The impeller hub 10 is rotatably supported in a boss portion 12a through a needle bearing 25. The boss portion 12a is formed by a central through hole of the oil pump cover 13 integral with the transmission case 2. An oil seal 26 is mounted between the boss portion 12a on the tip side and the impeller hub 10. A part of the drain oil passage 5 communicating with the converter case is thus formed by a gap a between an outer peripheral surface of the stator shaft 11 and an inner peripheral surface of the impeller hub 10, and a gap b between an outer peripheral surface of the impeller hub 10 and the pump cover boss portion 12a. The needle bearing 25 is provided in the gap b, and a relatively large amount of drain oil flows (e.g., 2 to 3 l/min) as compared to the case where a bush is provided in the gap b.

Figure 2:
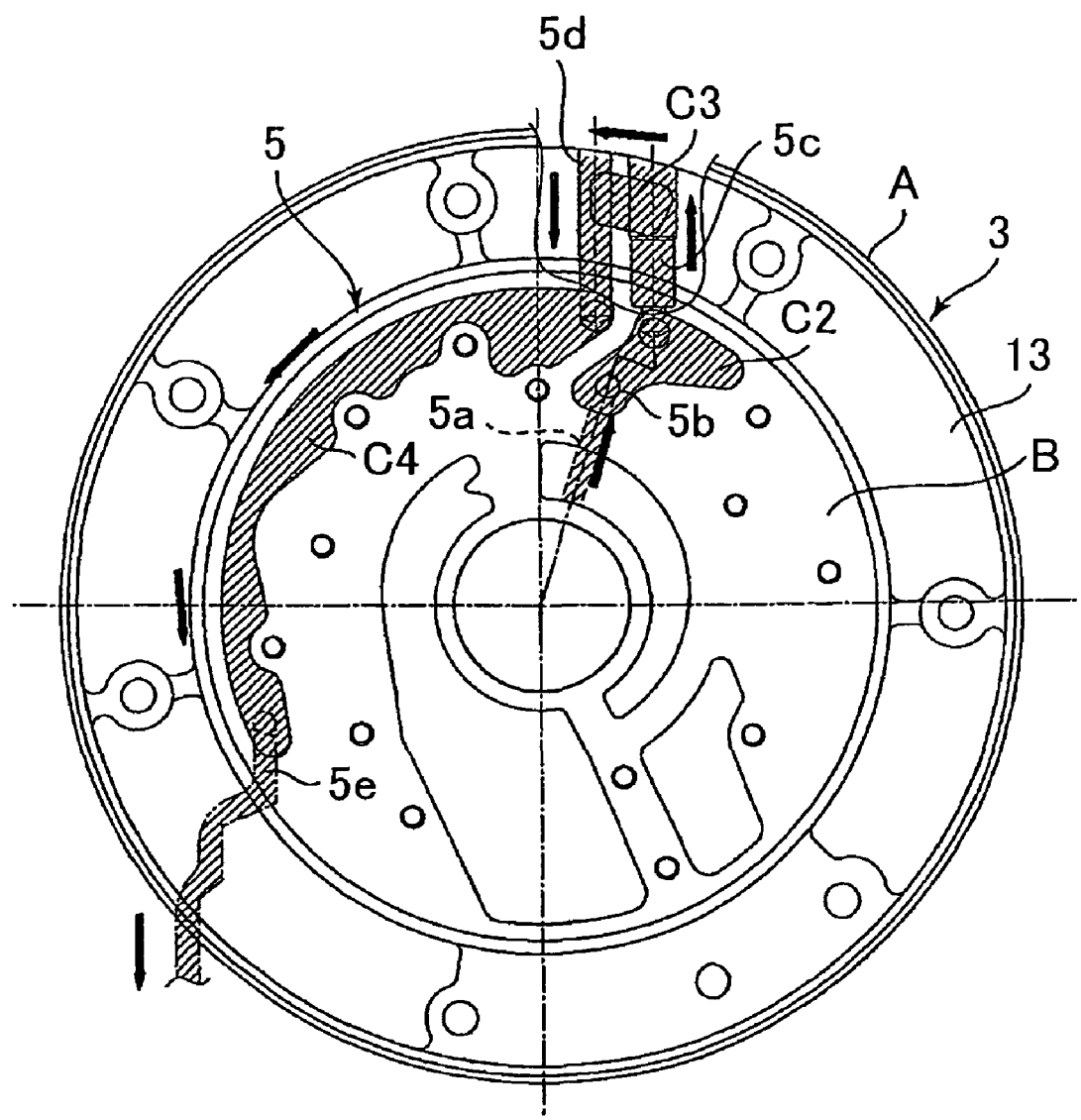
FIG. 2 is a front view of an oil pump cover showing the first embodiment.

As shown in FIGS. 1 and 2, the drain oil passage 5 of the first embodiment is structured so as to communicate with the gap b and the cast holes C1, C2 of the mating surface B by holes 5a and 5b. The hole 5a is formed radially obliquely in the oil pump body 12, and the hole 5b is formed axially in the oil pump body 12. A hole 5c is formed by machining so as to extend from an upper outer peripheral surface of the oil pump cover 13 to the cast hole C2 in an inner-diameter direction. The hole 5c is formed so as to extend through the cast hole C3. A hole 5d is formed by machining in parallel with the hole 5c. The hole 5d extends through the cast hole C3 connecting to a joint surface D with the transmission case 2, and communicates with an upper part of the cast hole C4 connecting to the mating surface B with the oil pump body 12. Accordingly, the holes 5c, 5d communicate with each other in the cast hole C3 located in the uppermost part of the oil pump cover 13, and the portion of the cast hole C3 forms the uppermost part of the drain oil passage 5.

As shown in FIG. 2, the cast hole C4 of the joint surface is formed so as to extend long, continuously from an upper portion to a lower portion along the outer periphery of the oil pump body 12. The cast hole C4 together with the other cast holes C1, C2, and C3 occupy a large part (most part) of the drain oil passage 5. Further, the drain oil passage 5 communicates, from a lower end of the cast hole C4, with a lower outer peripheral surface of the oil pump cover 13 through a machined hole 5e, and extends through an axial concave groove 5f formed in the fitting surface A of the transmission case 2 under the pump cover. Under the fitting surface A, the drain oil passage 5 opens above the oil level in the transmission case 2. Drain oil that is discharged from this opening 5g into the case 2 is directly discharged above the oil level toward an oil pan 27 provided under the transmission case 2.

In the drain oil passage 5 of the first embodiment, the drain oil (ATF) from the drain converter 7 is guided to the holes 5a, 5b through the gaps a, b and the needle bearing 25, and is further guided through the cast holes C1, C2 and the hole 5c to the cast hole C3 of the uppermost part. The difference in height between the uppermost part and the uppermost position of the torque converter 7 is not so large. This structure reduces the amount of oil flowing out of the torque converter due to the water head difference, and retains the oil level in the torque converter at an appropriate height.

The drain oil is guided from the cast hole C3 of the uppermost part through the hole 5d into the long cast hole C4 formed in the mating surface B. The drain oil further flows through the hole 5e, the concave groove 5f and is directly discharged above the oil level toward the oil pan 27 from the opening 5g formed under the fitting surface A. Thus, the drain oil from the torque converter 7 will not be scattered to frictional members such as the drum 21 and the brake 22 of the automatic speed change mechanism. Therefore, breather blow can be prevented from occurring due to bubbles generated in the oil stirred by rotation of the drum. Moreover, power loss can be prevented from occurring due to a dragging torque generated in the frictional members in a disengaged state.

The drain oil passage 5 does not use the fitting surface (spigot portion) A for fitting the oil pump (cover) 3 in the transmission case 2. Problems resulting from forming an oil passage in the fitting surface, such as blow holes, increase in diameter of the transmission case, and incomplete attachment of the oil pump due to insufficient spigot, can be eliminated.

The drain oil passage 5 mostly uses the cast holes C1, C2, C3, and C4 of the oil pump formed by aluminum die casting. Accordingly, machining for the oil passage structure can be reduced, and interference with other oil passages can be prevented. As a result, a simple, easy-to-manufacture drain oil passage can be obtained.

Figure 3A:
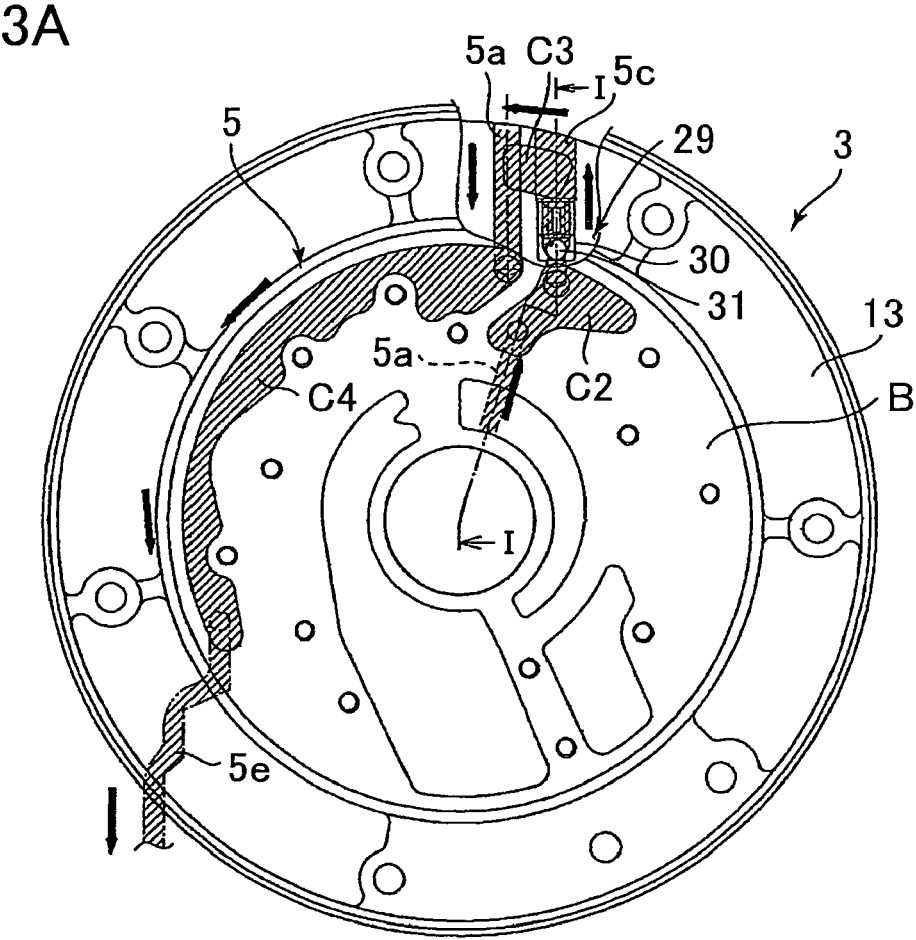
FIG. 3A and FIG. 3B show diagrams of a second embodiment of the present invention, FIG. 3A being a front view of an oil pump cover and FIG. 3B being a cross-sectional view taken along line I-I in FIG. 3A.
Figure 3B:
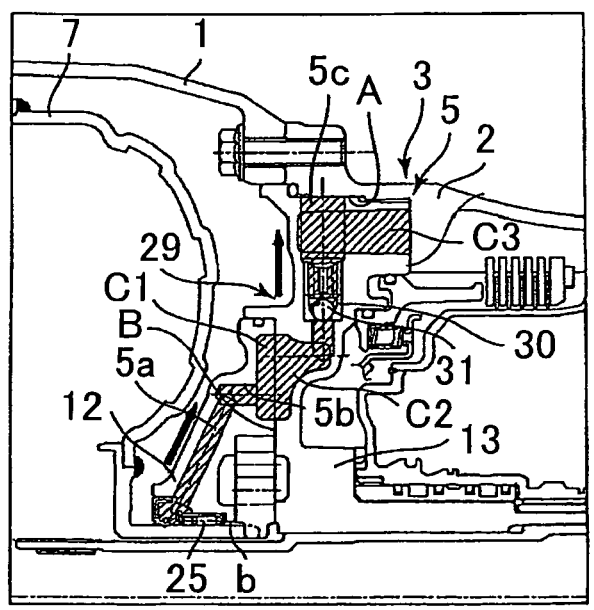

FIGS. 3A and 3B are diagrams showing a second embodiment. Since the structure of a drain oil passage 5 is the same as that of the first embodiment, the elements of the drain oil passage 5 are denoted by the same reference numerals and characters as those of the first embodiment and description thereof will be omitted.

The characteristic feature of the second embodiment is that a check valve 29 for allowing an oil flow in the flowing direction of drain oil and blocking a flow of the opposite direction is provided in a hole 5c formed in an upper part. The check valve 29 has a sleeve 30 fitting in the hole 5c extending in a vertical direction and guiding the oil upward from the upper position. A valve seat is formed under the sleeve and a ball 31 is provided so as to be seated on the valve seat.

Accordingly, when the drain oil flows through the drain oil passage 5 in a discharging direction, the check valve 29 does not prevent this oil flow. However, in the case where air enters the torque converter through a gap in a lock-up switch valve or the like and the oil level of the torque converter is lowered, the oil in the hole 5c tries to flow backward. However, the check valve 29 prevents this flow and thus prevents the air from being introduced into the torque converter 7 through an opening of the drain oil passage 5. Lowering of the oil level in the torque converter can thus be delayed.

Note that the check valve 29 may be biased in a seating direction by gravity applied to the ball 31 or may be biased by a spring.

Figure 4A:
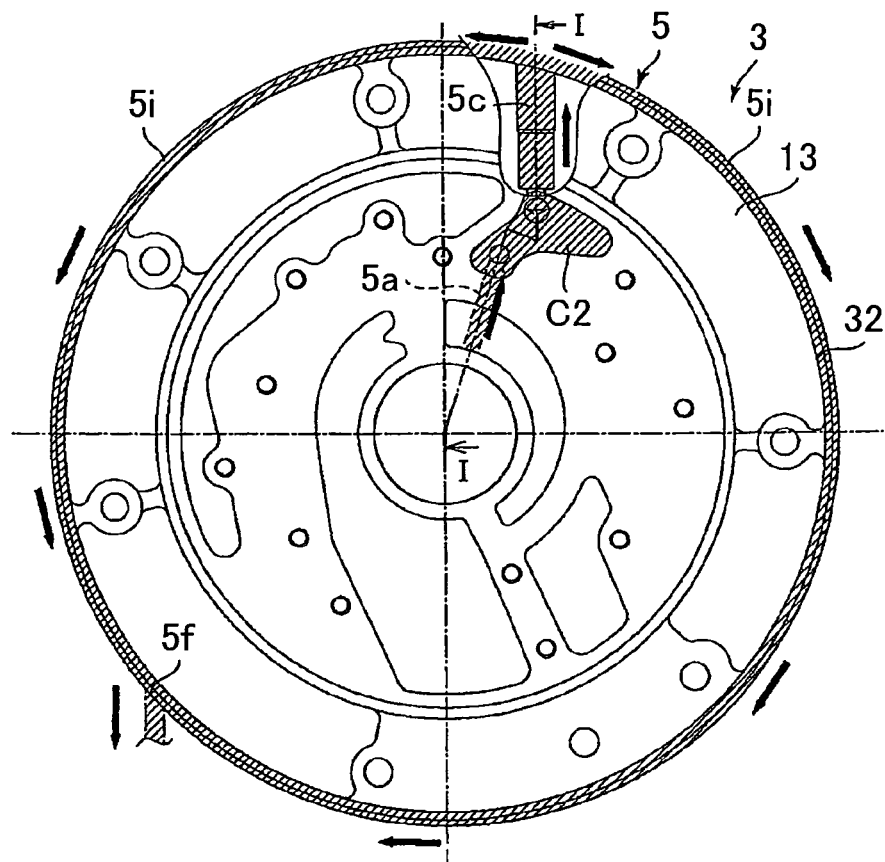
FIG. 4A and FIG. 4B show diagrams of a third embodiment of the present invention, FIG. 4A being a front view of an oil pump cover and FIG. 4B being a cross-sectional view taken along line I-I in FIG. 4A.
Figure 4B:
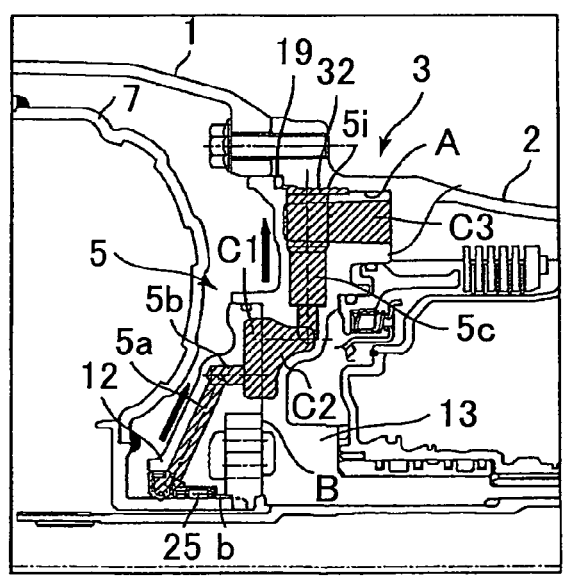

FIGS. 4A and 4B are diagrams showing a third embodiment. A fitting surface (spigot portion) between an oil pump and a transmission case is used as a part of a drain oil passage 5.

The drain oil passage 5 is the same as in the above embodiments regarding the gaps a, b, the holes 5a, 5b, the cast holes C1, C2, and the vertical hole 5c. However, a concave scooped groove (concave groove) 32 is formed along the whole outer peripheral surface of the oil pump cover 13. An annular circumferential oil passage 5i is formed between the concave groove 32 and a fitting surface A of a transmission case 2. The circumferential oil passage 5i forms a clockwise oil passage and a counterclockwise oil passage of FIG. 4A using the hole 5c of the upper part and the axial concave groove 5f shown in FIG. 1.

The circumferential oil passage 5i is held in an oil-tight state by an O-ring 19 and the spigot portion A. Since the circumferential oil passage 5i is divided into the clockwise and counterclockwise oil passages, a required cross-sectional area of the flow passage is small, and the concave groove 32 can be formed in a shallow, wide shape. Therefore, blow holes are less likely to be formed. Moreover, since the circumferential oil passage 5i is formed on the outer peripheral surface of the oil pump case 13, increase in diameter of the transmission case 2 is not required, and incomplete attachment of the oil pump due to insufficient spigot is less likely to occur.

The upper end of the drain oil passage 5 reaches its highest level near the upper part of the vertical hole 5c, whereby the water head difference from the torque converter 7 can be reduced. Moreover, the drain oil from the vertical hole 5c is branched by the circumferential oil passage 5i. A sufficient overall flow rate can thus be ensured by the clockwise and counterclockwise flows even through the cross-sectional area of the flow passage is relatively small. The clockwise and counterclockwise oil passages of the circumferential oil passage 5i are merged by a concave groove 5f formed under the fitting surface A. Then, the drain oil is directly discharged toward an oil pan from an opening formed in a lower part of the transmission case, in the same manner as in the above-described embodiments.

FIGS. 5A and 5B are diagrams showing a fourth embodiment. The structure of the drain oil passage 5 is the same as that of the third embodiment. The fourth embodiment is the same as the above-described second embodiment in that a check valve 29 is provided in a vertical hole 5c of the drain oil passage. Accordingly, the drain circuit portion is denoted by the same reference numerals and characters as those of FIG. 4 and the check valve portion is denoted by the same reference numerals and characters as those of FIG. 3, and description thereof will be omitted.

The present invention is used in a torque converter included in an automatic transmission mounted on an automobile. The present invention relates to a drain structure for draining oil of the torque converter into a transmission case.

Note that the oil pump indicates a concept including one or both of the oil pump body and the oil pump cover. The oil pump includes both of the following cases: an oil pump having the oil pump body that fits in the transmission case; and an oil pump having the oil pump cover that fits in the transmission case.

According to an exemplary aspect of the invention, the drain oil passage has the upper part facing the fitting surface between the oil pump and the transmission case. Accordingly, the water head difference from the oil level in the torque converter is reduced, whereby the oil in the torque converter can be prevented from being discharged early. At the same time, the drain oil passage opens so that the oil can be directly discharged toward the oil pan. Accordingly, the oil will not be scattered onto an automatic speed change mechanism such as a drum, a clutch, and a brake in the transmission case. As a result, excessive stirring of the oil and generation of a dragging torque in the clutch or brake can be prevented.

According to an exemplary aspect of the invention, since the drain oil passage from the upper part toward the opening is formed on the mating surface between the oil pump body and the oil pump case, problems resulting from forming the drain oil passage so as to face the fitting surface between the oil pump and the transmission case can be eliminated, such as influences of blow holes, increase in diameter of the transmission case, or defective attachment of the oil pump due to insufficient spigot.

According to an exemplary aspect of the invention, since the oil passage formed on the mating surface uses the cast hole of the oil pump, an oil passage portion formed by machining can be reduced and interference with other oil passages can be prevented. As a result, manufacturing can be simplified.

According to an exemplary aspect of the invention, since the oil passage that guides the drain oil from the upper part to the opening is formed by the circumferential oil passage formed along the whole peripheral surface so as to face the fitting surface, the drain oil can be branched in the upper part by the circumferential oil passage, and the flow passage area of the drain oil passage can be reduced by half. The possibility of blow holes and the above-mentioned problems resulting from formation of an oil passage on the fitting surface can be reduced accordingly. Thus, the drain oil passage can be formed without trouble.

According to an exemplary aspect of the invention, providing the check valve in the oil passage extending to the upper part delays oil reduction of the torque converter due to a small amount of oil leakage from another oil passage that communicates with the torque converter. As a result, torque transmission can be prevented from being delayed due to oil shortage right after startup operation after operation of a vehicle has been discontinued for a long time.

What is claimed is:

1. A drain structure of a torque converter in an automatic transmission, the automatic transmission including the torque converter, an oil pump formed by an oil pump body and an oil pump cover, a transmission case accommodating the oil pump and an automatic speed change mechanism, and an oil pan provided under the transmission case, wherein:

oil sucked from the oil pan by the oil pump is supplied to the torque converter and circulates therein, and the oil is drained into the transmission case through a drain oil passage, and the drain oil passage passes through a gap between the torque converter and the oil pump, is guided to an upper part facing a fitting surface between the oil pump and the transmission case, and is further guided from the upper part to a part under the oil pump and opens above an oil level in the transmission case through a concave groove formed on the fitting surface between the oil pump and the transmission case, and drain oil from the drain oil passage is discharged toward the oil pan.

2. The drain structure of the torque converter according to claim 1, wherein the drain oil passage guides the drain oil from the upper part to an opening that is formed on a mating surface between the oil pump body and the oil pump cover.

3. The drain structure of the torque converter according to claim 2, wherein the drain oil passage that is formed on the mating surface uses a cast hole of the oil pump.

4. The drain structure of the torque converter according to claim 1, wherein:

the drain oil passage guides the drain oil from the upper part to an opening that is a circumferential oil passage formed along a whole peripheral surface so as to face the fitting surface between the oil pump and the transmission case, and the drain oil from the upper part is branched in opposite directions by the circumferential oil passage and branched oil flows are then merged toward the opening.

5. The drain structure of the torque converter according to claim 1, wherein a check valve that allows a flow in a direction from the torque converter toward the transmission case and blocking a flow in an opposite direction is provided in an oil passage extending to the upper part in the drain oil passage.

* * * * *